United States Patent [19]
Maximovich

[11] 3,896,090
[45] July 22, 1975

[54] PROCESS FOR PREPARING POLYCARBONATES
[75] Inventor: Michael J. Maximovich, Akron, Ohio
[73] Assignee: PPG Industries, Inc., Pittsburgh, Pa.
[22] Filed: Sept. 4, 1973
[21] Appl. No.: 393,875

Related U.S. Application Data
[63] Continuation-in-part of Ser. No. 215,410, Jan. 4, 1972, abandoned.

[52] U.S. Cl.. 260/77.5 D; 260/2.5 AM; 260/42 EP; 260/47 X A; 260/77.5 AT; 260/463
[51] Int. Cl.................. C08g 17/13; C08g 17/007
[58] Field of Search........................ 260/77.5 D, 463

[56] References Cited
UNITED STATES PATENTS

| | | | |
|---|---|---|---|
| 2,789,964 | 4/1957 | Reynolds et al. | 260/77.5 D |
| 2,789,965 | 4/1957 | Reynolds et al. | 260/77.5 D |
| 3,248,414 | 4/1966 | Stevens | 260/77.5 D |
| 3,248,415 | 4/1966 | Stevens | 260/77.5 D |

Primary Examiner—Wilbert J. Briggs, Sr.
Attorney, Agent, or Firm—Irwin M. Stein

[57] ABSTRACT

Polycarbonates prepared from an alkylene carbonate (or 1,2-epoxide with carbon dioxide) and monomeric polyols are prepared in good yield in short reaction times at atmospheric pressure containing high carbon dioxide concentrations, by employing an alkali metal, alkaline earth metal or ammonium borate or hydrocarbyloxy titanate catalyst, such as sodium or potassium borate or titanium acid n-butylate.

11 Claims, No Drawings

PROCESS FOR PREPARING POLYCARBONATES

CROSS-REFERENCE TO RELATED APPLICATIONS

This application is a continuation-in-part application of my earlier co-pending application Ser. No. 215,410, filed Jan. 4, 1972 now abandoned.

DESCRIPTION OF THE INVENTION

This invention relates to a novel process for preparing polycarbonates from carbon dioxide and 1,2-epoxides or from alkylene carbonates and a minor amount of a monomeric polyol, in the presence of a catalytic amount of an alkali metal, alkaline earth metal or ammonium borate or hydrocarbyloxy titanate catalyst.

Methods for preparing the aforesaid polycarbonates are exemplified by Stevens, U.S. Pat. Nos. 3,248,414, 3,248,415, and 3,248,416 which teach the preparation of polycarbonates from: (1) carbon dioxide and 1,2-epoxides; (2) cyclic carbonates such as ethylene carbonate or (3) from cyclic carbonates and a 1,2-epoxide. A minor amount of a polyol, such as between about 0.005 and about 0.2 mole of polyol per mole of cyclic carbonate or epoxide is employed as an initiator. The reaction is usually conducted under pressure in the presence of a metal carbonate, metal hydroxide, trisodium phosphate or a tertiary amine catalyst.

It has now been discovered that polycarbonates can be produced with the aforesaid reactants in good yields and/or with a higher carbonate content when the reaction is conducted in the presence of a catalytic amount of an alkali metal, alkaline earth metal or ammonium borate or hydrocarbyloxy titanate catalyst.

DETAILED DESCRIPTION

Alkylene carbonates useful for the preparation of polycarbonates in accordance with the present invention are cyclic carbonate polymerizable with an organic compound containing two or more active hydrogens, notably polyhydric alcohols, in the presence of the catalysts described herein. Typically, the cyclic carbonates will be five-membered cyclic carbonates, such as alkylene carbonates (carbonates derived from 1,2-glycols). For the most part, these alkylene carbonates contain from 3 to 6 carbon atoms inclusive.

Suitable cyclic carbonates contain the radical,

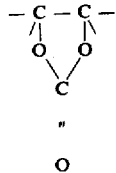

wherein the unsaturated valences of the carbon atoms as above depicted are in part or completely satisfied with hydrogen, alkyl and alkenyl radicals. Alkylene carbonates can be represented further by the general formula,

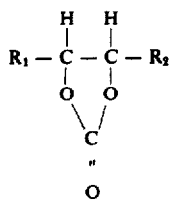

wherein $R_1$ and $R_2$ are each selected from the group hydrogen or $C_1$–$C_3$ alkyl.

Examples of alkylene carbonates include, ethylene carbonate, propylene carbonate, 1,2-butylene carbonate, 2,3-butylene carbonate, vinyl ethylene carbonate and 1,2-propylene carbonate. Mixtures of alkylene carbonates can, of course, be used.

Vinylene carbonate and other such cyclic carbonate which includes an unsaturated carbon to carbon bond in their ring such as methyl vinylene carbonate, ethyl vinylene carbonate, propyl vinylene carbonate, and dimethyl vinylene carbonate may be employed to obtain high molecular weight polycarbonates containing olefinic unsaturation. These unsaturated cyclic carbonates are less desirable than the alkylene carbonates because they are more expensive.

The epoxides then can be reacted with carbon dioxide to prepare polycarbonates in accordance with the present invention are those epoxides, e.g., 1,2-epoxides, that are copolymerizable with carbon dioxide in the presence of an organic compound containing two or more active hydrogens, e.g., polyhydric alcohol such as ethylene glycol and in the presence of the catalysts described herein.

Suitable epoxides include acyclic 1,2-epoxides, such as the alkylene oxides, e.g., ethylene oxide and propylene oxide, or like olefinically saturated aliphatic 1,2-epoxides of up to (and including) 5 carbon atoms. By 1,2-epoxide, a compound having a reactive

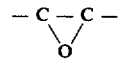

group is intended. Such compounds are often referred to as oxiranes. Other 1,2-epoxides include cyclohexene monoepoxide, 4-vinyl cyclohexene monoxide, 4-vinyl cyclohexene dioxide, butadiene diepoxide and styrene oxide.

It is possible to employ more than one aliphatic 1,2-epoxide. Ethylene oxide functions with particular ease and hence is preferred. For certain purposes, more randomness in the linear polycarbonate molecule adds desirous properties. To accomplish this, two or more different 1,2-epoxides, e.g., a mixture of ethylene oxide and propylene oxide, may be used. Ethylene oxide preferably comprises the major 1,2-epoxide component. Mixtures, by way of example, of ethylene oxide and propylene oxide wherein the ethylene oxide comprises from 55 to 95 percent ethylene oxide by weight are especially valuable.

The organic compound used in conjunction with the aforesaid epoxide or alkylene carbonate are those organic compounds having 2 or more active hydrogens, e.g., a monomeric polyol. By active hydrogen is meant, a hydrogen linked directly to a nitrogen, sulfur or oxygen atom such as is found in hydroxy, non-tertiary amino, mercapto, and carboxyl groups. The organic compound containing the active hydrogens, e.g., a polyhydric alcohol, appears to be the chemical instrumentality by which the polymerization or copolymerization, as the case may be, is achieved.

Monomeric polyols useful in the present invention include diols of the formula HO—R—CH wherein R is an alkylene radical or a bivalent polyalkylene ether radical of from 2 to 25 carbon atoms or more. Examples of such polyols include: dihydric polyols, e.g., ethylene glycol, diethylene glycol, triethylene glycol, propylene glycol, dipropylene glycol and other such polyols. The polyols preferably contain from 2 to about 10 carbon atoms; and preferably contain not more than 4 hydroxyl groups. The compounds with more hydroxyl groups such as sugars tend to result in discoloration and best results have generally been found with diols having no ether linkages such as ethylene glycol and propylene glycol and, more preferably, the former. Exemplary of suitable triols are glycerol, trimethylolethane and trimethylolpropane. A suitable tetrol is pentaerithrytol. Also cycloaliphatic diols such as 1,3-dihydroxy cyclopentane and aromatic dihydroxy compounds such as catechol, bisphenols, and xylene glycols are useful. Beside polyols, however, other organic compounds having at least 2 active hydrogens, usually from 2 to 4, can be employed. These include polyamines, mercaptans, alkylolamines, and the like. Examples of other such organic compounds useful herein are described in U.S. Pat. No. 3,248,415, Column 6, lines 40–57. The aforesaid disclosure is incorporated herein by reference.

Carbon dioxide, either as a gas, liquid, or solid, can be charged to the reaction system. Gaseous carbon dioxide is preferred.

The amount of organic compound having 2 or more active hydrogens, e.g., polyhydric alcohol, used in conjunction with the alkylene carbonate or epoxide will vary. Typically, from about 0.005 to about 0.2 mole of organic compound per mole of alkylene oxide or alkylene carbonate is used. Preferably, from about 0.01 to about 0.2, and more preferably from about 0.02 to about 0.1 mole of such organic compound per mole of epoxide or alkylene carbonate is used. Generally, polycarbonates of higher molecular weight result when less organic compound, e.g., 0.02 to 0.05 mole of polyhydric alcohol are used; and polycarbonates of lower molecular weight result when more organic compound, e.g., 0.08 to 0.10 mole of polyhydric alcohol are used.

The amount of carbon dioxide used can range, for example, from 1 to 6 moles of alkylene oxide per mole of carbon dioxide.

The polycarbonates having terminal hydroxyl groups produced by the present process will have molecular weights ranging from about 300 to about 5,000.

These hydroxy-terminated polycarbonates can be used in many applications. By virtue of their reactive terminal hydroxyl groups, they may be reacted with polycarboxylic acids such as phthalic, maleic, succinic, fumaric and adipic among others to obtain alkyd type resins which are useful as laminating resins, molding resins, coating compositions for metals, wood and woven fibrous products such as silk, cotton, wool and rayon. The polycarbonates with a higher carbon dioxide content (by use of the preferred catalysts herein and the preferred ethylene glycol which permits lower reaction temperatures and times) are particularly suitable for reaction with diisocyanates to form rubbery urethanes of high quality; or, foaming agents can be employed to form products useful as crash pads or upholstery pillows. The polycarbonates that have a high $CO_2$ content, e.g., from about 20 to 30 percent, are quite viscous and, in general, the viscosity rises by a factor of 10 when the $CO_2$ content is doubled from 12.5 to 25 percent. When the molecular weight is doubled from 800 to 1,600 however, the viscosity rises only by a factor of 2–3. These products can be employed as a partial or complete replacement for adipate esters and polytetramethylene ethers in elastomeric urethane formulations.

The highly viscous products can be recovered by treating said products at a temperature between about room temperature and 50°C. for up to about 2 hours with a suitable solvent such as anhydrous methylene chloride to sufficiently reduce the viscosity for filtration, and then the mixture can be filtered under pressure and the filtrate preferably treated with a filtering aid. The product can then be recovered by removal of the solvent.

In accordance with the present invention, polycarbonates are prepared by the polymerization of alkylene carbonate or epoxide with carbon dioxide with active hydrogen organic compounds, e.g., monomeric polyols such as dihydric alcohols, in the presence of an alkali metal, alkaline earth metal or ammonium borate catalyst, or a hydrocarbyloxy titanate catalyst. Preferred borate catalysts are the alkali metal and ammonium metaborates and tetraborates.

Exemplary of suitable alkali metal borates are: lithium, sodium and potassium borates. Suitable alkaline earth metal borates include: magnesium, calcium, and barium borates. The tetraborates and metaborates formed from the alkali metals and ammonium, and particularly sodium and potassium tetraborate, are preferred.

Exemplary of suitable catalysts are:

sodium metaborate — ($NaBO_2$)
sodium metaborate tetrahydrate — ($NaBO_2.4\ H_2O$)
sodium metaborate dihydrate — ($NaBO_2.2\ H_2O$)
sodium pentaborate pentahydrate — ($NaB_5O_8.5\ H_2O$)
sodium tetraborate decahydrate — ($Na_2B_4O_7.10\ H_2O$)
sodium tetraborate pentahydrate — ($Na_2B_4O_7.5\ H_2O$)
diammonium tetraborate tetrahydrate — ($NH_4)_2B_4O_7.4\ H_2O$
ammonium hydrogen tetraborate trihydrate — ($NH_4)HB_4O_7.3\ H_2O$
lithium orthodiohydroborate — $LiH_2BO_3.7\ H_2O$
lithium metaborate — $LiBO_2$
lithium tetraborate — $Li_2B_4O_7$
lithium pentaborate pentahydrate — $LiB_5O_8.5\ H_2O$
potassium metaborate — $K_2B_2O_4$
potassium tetraborate tetrahydrate — ($K_2B_4O_7.4\ H_2O$)
potassium tetraborate pentahydrate — $K_2B_4O_7.5\ H_2O$
potassium pentaborate tetrahydrate — $KB_5O_8.4\ H_2O$
magnesium metaborate trihydrate — $Mg(BO_2)_2.3\ H_2O$
magnesium diborate — $Mg_2B_2O_4.H_2O$
magnesium orthoborate — $Mg_3(BO_3)_2$
calcium metaborate — $Ca(BO_2)_2$
calcium tetraborate — $CaB_4O_7$
strontium tetraborate tetrahydrate — $SnB_4O_7.4\ H_2O$ The particular form of alkali metal, alkaline earth metal or ammonium borate used as the catalyst in the present invention is not particularly important, although the metaborates and tetraborates are preferred, for the reason that when acting as a catalyst, the borate salts should perform the same function. The particular hydrate form of the borate catalyst is not deemed critical. At the temperature at which the polymerization is conducted, the vapor pressure of water, i.e., the hydrate portion of the borate, is well above atmospheric pressure. Therefore, any water introduced with the catalyst would be driven off and would not be expected to affect the catalytic activity of the borate salt. Further, the amount of water introduced as the hydrate is insignificant. Thus, anhydrous borates are also useful as catalysts herein.

The titanates that can be employed as the catalyst in the present invention are hydrocarbyloxy salts of tetravalent titanium as taught by Meerwein et al. (Annalen der Chemie 476, 113–50 (1929). Exemplary of suitable titanates are those of the formulae:

$$MHTi(OR)_6 \text{ and } M_2Ti(OR)_6$$

wherein M is an alkali metal, alkaline earth metal, or ammonium as exemplified with the borates. Preferably M is an alkali metal such as lithium, sodium or potassium. R is a hydrocarbyl radical to include primary and secondary alkyl, cycloalkyl, phenyl, and equivalent hydrocarbyl radicals. Generally, the hydrocarbyl radicals will contain from 1 to 10, preferably from 4 to 6 carbon atoms.

Exemplary of preferred titanates are the following:

potassium acid titanium n-butylate — $KHTi(OC_4H_9)_6$
potassium acid titanium per n-butylate — $Ti(OC_4H_9)_6 \cdot H_2 \cdot Ti(OC_4H_9)_6HK$
potassium titanium n-hexylate — $K_2Ti(OC_6H_{13})_6$
sodium titanium n-butylate — $Na_2Ti(OC_4H_9)_6$
lithium acid titanium n-hexylate — $LiHTi(OC_6H_{13})_6$ The amount of catalyst used will, of course, depend upon the reactants and particular catalyst employed. Only that amount required to catalyze the polymerization, i.e., a catalytic amount, need be employed. Generally, between about 0.01 to about 5 weight percent, usually from about 0.1 to about 2.0 weight percent of catalyst based on the weight of the reactants, i.e., of the cyclic carbonate or 1,2-epoxide, will be sufficient.

The temperature at which the polymerization can be conducted will vary from about 100°C. to about 300°C., e.g., from 140°C. to 200° or 250°C. Temperatures of polymerization should be kept below those at which substantial rupture or degradation of the polycarbonate molecules are encountered. Polymerization times will vary. Generally, reaction periods of from 4 to 24 hours are suitable. One of the benefits of the invention is that with the preferred sodium and potassium borate catalysts, the reaction or polymerization can generally be conducted at atmospheric pressure. However, superatmospheric pressure can be used.

The polymerization can be conducted by methods established in the art, e.g., U.S. Pat. Nos. 3,248,414 and 3,248,415. Generally, the reactants and catalyst are charged to a suitable reaction vessel and brought to polymerization temperature. The reaction can be followed by, for example, the carbon dioxide removed from the reaction vessel.

The following Examples will serve to illustrate the invention and the preferred embodiments thereof. All percentages in said Examples and elsewhere in the specification are by weight unless otherwise indicated.

EXAMPLE I

Diethylene glycol (7.0 grams, 0.066 mole), ethylene carbonate (176 grams, 2.0 moles) and catalyst (0.00073 mole) were charged to a 3-necked, 500 milliliter round-bottom flask fitted with a thermometer, motor driven Tru-Bore paddled stirrer and a bulb-type condenser cooled to 15°C. The reaction was indicated by the evolution of carbon dioxide bubbles in a mineral oil bubbler. The reaction was conducted under atmospheric presure at 195°C. using a heating mantle. After the reaction was complete, the crude product mixture was transferred to a 200-cubic centimeter distillation flask equipped with a Claisen head and distilled at 195°C. and 3 millimeters of mercury pressure under a stream of nitrogen to remove the high boiling unreacted ethylene carbonate and other volatiles from the viscous product. The polycarbonate products were recovered, analyzed, and are reported in the following Table I with the reaction times and catalysts employed.

EXAMPLE II

Potassium acid titanium n-butylate ($KH[Ti(OC_4H_9)_6]$) was made by the method of Meerwein et al. Annalen der Chimie 476, 113–50 (1929), except that the reactants were charged in a 1:1 ratio, and the catalyst employed to make a polycarbonate pursuant to the procedure of Example I. The results are reported in Table I.

Table I

| Catalyst[1] | Time (Hr.) | $CO_2$ Loss (g.)[2] | Volatiles (g.)[3] | Product (g.) | Polymer % $CO_2$ | Character Mol. Wt. |
|---|---|---|---|---|---|---|
| $Li_2CO_3$ | 3.0 | 29.6 | 114.4 | 39.0 | 17.6 | 1635 |
| $Na_2CO_3$ | 2.5 | 73.6 | 16.7 | 92.7 | 13.4 | 1230 |
| $K_2CO_3$ | 2.0 | 81.0 | 0.0 | 102.0 | 11.6 | 1380 |
| $Na_2B_4O_7 \cdot 10 H_2O$ | 3.0 | 70.5 | 6.4 | 107.4 | 19.6 | 1566 |
| $K_2B_4O_7 \cdot 4 H_2O$ | 2.0 | 66.0 | 11.0 | 106.0 | 19.7 | 1320 |
| $NaBO_2$ | 2.0 | 66.4 | 22.8 | 93.8 | 16.6 | 1270 |
| $NaBO_2 \cdot 4 H_2O$ | 3.0 | 53.7 | 46.2 | 83.1 | 16.5 | 1420 |
| $KHTi(OC_4H_9)_6$ | 2.0 | 64.6 | 7.0 | 104.5 | 22.7 | 1650 |

[1]The catalyst level was 0.00073 moles per 2.0 moles, 176 grams of ethylene carbonate. When lithium salts were used, the catalyst level was raised to 0.00146 moles per 2.0 moles ethylene carbonate. The $K_2B_4O_7 \cdot 4 H_2O$ catalyst was used at a 0.00068 molar concentration.
[2]The weight loss during the reaction was assumed to be only $CO_2$.
[3]The volatiles topped from the crude product were mainly ethylene carbonate, but some low boiling glycols were present.

From the results of Table I, it can be seen that with the use of the borate and titanate catalysts of the invention, more product can be obtained in the same amount or less time than is possible with previously used catalysts. In addition, a higher carbon dioxide content can be obtained with the catalysts of the invention.

EXAMPLE 3

Ethylene oxide, diethylene glycol and sufficient carbon dioxide to establish a reactor pressure of 90 p.s.i.g. are introduced into a suitable reaction vessel capable of withstanding such pressures. The polymerization is conducted at about 188°C. for about 3 hours. Potassium tetraborate tetrahydrate is used as the catalyst. A similar polymerization is conducted using potassium carbonate for comparison. At the end of both polymerizations, the polycarbonate product is analyzed for molecular weight and carbon dioxide content. The results and amounts of reactants used are reported in Table II.

TABLE II

| Catalyst (0.030 mole) | Reactants | | Ethylene Oxide Feed Rate (g/min) | Polymer Character | |
|---|---|---|---|---|---|
| | Ethylene Oxide (mole) | Diethylene Glycol (mole) | | % $CO_2$ | Mol. Wt. |
| $K_2CO_3$ | 27.3 | 5.9 | 10 | 5.9 | 350 |
| $K_2B_4O_7$ | 26.6 | 5.9 | 10 | 12.9 | 565 |

The data of Table II show that the borate catalyst doubled the carbon dioxide uptake in the polymer.

Although the present invention has been described with reference to the specific details of particular embodiments thereof, it is not intended thereby to limit the scope of the invention except insofar as the specific details are recited in the appended claims.

I claim:

1. In the process for preparing polycarbonates by the polymerization of alkylene carbonate, or 1,2-epoxide and carbon dioxide, with from about 0.005 to about 0.2 mole of an organic compound having at least 2 active hydrogens per mole of epoxide or alkylene carbonate, the improvement which comprises conducting said polymerization in the presence of a catalytic amount of a catalyst selected from the group consisting of alkali metal, alkaline earth metal or ammonium hydrocarbyloxy titanate catalyst, and sodium, potassium, lithium and ammonium tetraborates and metaborates.

2. The process of claim 1 wherein the active hydrogen compound is a polyhydric alcohol having the formula HO—R—OH, wherein R is an alkylene radical or divalent polyether group containing from 2 to 25 carbon atoms.

3. The process of claim 1 wherein the catalyst is sodium tetraborate.

4. The process of claim 1 wherein the catalyst is potassium tetraborate.

5. The process of claim 1 wherein the catalyst is sodium, potassium or ammonium metaborate.

6. The process of claim 1 wherein the catalyst is potassium acid titanium n-butylate.

7. The process of claim 1 wherein the catalyst is present in an amount of from 0.01 to about 5 weight percent based on the weight of the alkylene carbonate or 1,2-epoxide.

8. The process of claim 1 wherein the alkylene carbonate is ethylene carbonate and the 1,2-epoxide is ethylene oxide.

9. In the process for preparing polycarbonates by the polymerization of alkylene carbonate, of 1,2-epoxide and carbon dioxide, with from about 0.005 to about 0.2 mole of a polyol per mole of epoxide or alkylene carbonate, the improvement which comprises conducting said polymerization in the presence of from about 0.01 to about 5 weight percent, based on the weight of the alkylene carbonate or 1,2-epoxide, of sodium, potassium, lithium or ammonium tetraborate or metaborate.

10. The process of claim 9 wherein the polyol is a dihydric polyol containing from 2 to 10 carbon atoms.

11. The process of claim 10 wherein the alkylene carbonate and 1,2-epoxide are ethylene carbonate and ethylene oxide, respectively.

* * * * *